United States Patent
Furuya et al.

(10) Patent No.: US 9,824,168 B2
(45) Date of Patent: Nov. 21, 2017

(54) MAGNETIZATION ANALYSIS APPARATUS, MAGNETIZATION ANALYSIS METHOD, AND RECORDING MEDIUM

(71) Applicant: FUJITSU LIMITED, Kawasaki-shi (JP)

(72) Inventors: Atsushi Furuya, Yokohama (JP); Tadashi Ataka, Kawasaki (JP); Koichi Shimizu, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 363 days.

(21) Appl. No.: 14/737,537

(22) Filed: Jun. 12, 2015

(65) Prior Publication Data
US 2016/0048617 A1    Feb. 18, 2016

(30) Foreign Application Priority Data
Aug. 13, 2014 (JP) ................. 2014-164980

(51) Int. Cl.
*G06F 17/50* (2006.01)
*G01R 33/00* (2006.01)

(52) U.S. Cl.
CPC ......... *G06F 17/5018* (2013.01); *G01R 33/00* (2013.01); *G01R 33/0064* (2013.01); *G06F 2217/16* (2013.01)

(58) Field of Classification Search
USPC .................................................. 703/2, 6, 18
See application file for complete search history.

(56) References Cited

U.S. PATENT DOCUMENTS

| 7,868,404 B2 * | 1/2011 | Deak | B82Y 25/00 257/421 |
| 2009/0117370 A1 * | 5/2009 | Deak | B82Y 25/00 428/332 |

(Continued)

FOREIGN PATENT DOCUMENTS

| JP | 2010-277654 | 12/2010 |
| JP | 2012-033116 | 2/2012 |

(Continued)

OTHER PUBLICATIONS

Extended European Search Report dated Jun. 8, 2016 for corresponding European Patent Application No. 15172063.8, 8 pages.

(Continued)

*Primary Examiner* — Thai Phan
(74) *Attorney, Agent, or Firm* — Fujitsu Patent Center (57) ABSTRACT

A magnetization analysis apparatus includes a processor configured to execute a process. The process includes: first calculating, using a magnetization vector of each of elements obtained by mesh division in which a magnetic substance is divided into a plurality of meshes and a magnetization vector of an element adjacent to each element, intermediate magnetization that is a magnetization vector at the halfway point between each element and an element adjacent to each element; second calculating an effective magnetic field using the intermediate magnetization calculated at the first calculating; and third calculating a magnetization vector of each element after a unit time based on the effective magnetic field calculated at the second calculating.

6 Claims, 9 Drawing Sheets

(56) References Cited

U.S. PATENT DOCUMENTS

| | | | | |
|---|---|---|---|---|
| 2012/0029849 A1* | 2/2012 | Shimizu | ............... | G01R 33/00 |
| | | | | 702/57 |
| 2012/0046888 A1* | 2/2012 | Shimizu | ............... | G01R 33/00 |
| | | | | 702/57 |
| 2013/0006593 A1* | 1/2013 | Uehara | ............. | G01R 33/0064 |
| | | | | 703/2 |
| 2013/0166229 A1 | 6/2013 | Shimizu | | |
| 2015/0149103 A1* | 5/2015 | Shimizu | ............... | G01R 33/06 |
| | | | | 702/65 |

FOREIGN PATENT DOCUMENTS

| | | |
|---|---|---|
| JP | 2013-131072 | 7/2013 |
| JP | 2013-196462 | 9/2013 |
| WO | 2011114492 | 9/2011 |

OTHER PUBLICATIONS

Bottauscio, Oriano et al., "A Finite Element Procedure for Dynamic Micromagnetic Computations", IEEE Transactions on Magnetics, IEEE Service Center, New York, NY, US, vol. 44, No. 11, Nov. 1, 2008, pp. 3149-3152, XP011240034.

Lopez-Diaz, L. et al., "Topical Review: Micromagnetic stimulations using Graphics Processing Units", Journal of Physics D: Applied Physics, Institute of Physics Publishing Ltd, GB, vol. 45, No. 32, Jul. 27, 2012, pp. 1-17, XP020226739.

\* cited by examiner

MAGNETIZATION ANALYSIS APPARATUS, MAGNETIZATION ANALYSIS METHOD, AND RECORDING MEDIUM

CROSS-REFERENCE TO RELATED APPLICATION

This application is based upon and claims the benefit of priority of the prior Japanese Patent Application No. 2014-164980, filed on Aug. 13, 2014, the entire contents of which are incorporated herein by reference.

FIELD

The embodiments discussed herein are related to a magnetization analysis apparatus, a magnetization analysis method, and a computer-readable recording medium.

BACKGROUND

Micromagnetic simulation in which a magnetic substance is modeled as an assembly of small magnets and the domain state is numerically simulated is known as a technology for analyzing the magnetization behavior of a magnetic substance. Micromagnetic simulation is used to analyze the domain state of a micromagnetic device, such as a magnetic head of a hard disk drive (HDD) or a magnetoresistive random access memory (MRAM), and a magnetic material, such as a permanent magnet or a magnetic steel sheet.

Figure 13:
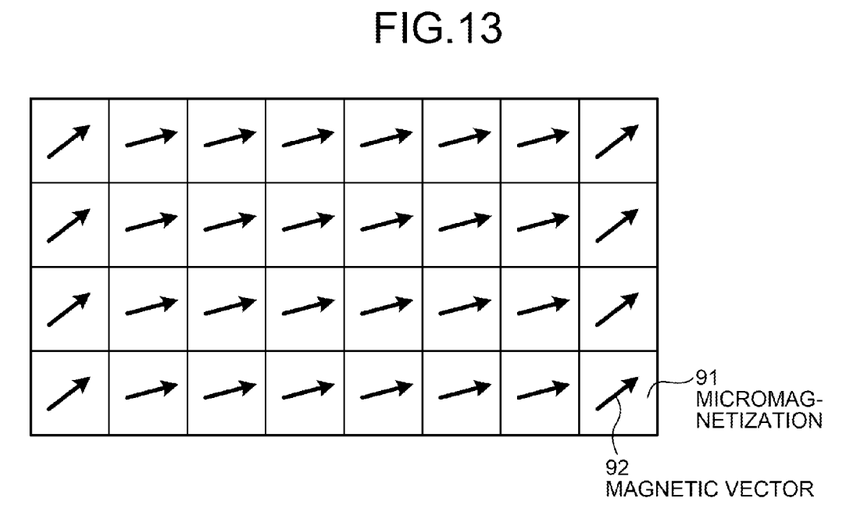
FIG. 13 is a diagram for explaining modeling of a magnetic substance by micromagnetization.

FIG. 13 is a diagram for explaining modeling of a magnetic substance by micromagnetization. The micromagnetization refers to individual small magnets. As illustrated in FIG. 13, a magnetic vector 92 is calculated per micromagnetization 91 in micromagnetic simulation.

In micromagnetic simulation, in order to ensure the calculation accuracy, the mesh size is adjusted such that the angles formed by magnetization vectors of meshes adjacent to each other are small angles so that the magnetization directions are regarded as approximately continuous. The mesh size is requested to be smaller than an exchange length. Particularly, in domain analysis on a permanent magnet with great magnetic anisotropy, the exchange length decreases to approximately one nanometer (nm). The exchange length represents the diameter of a crystal grain where an exchange occurs.

When calculations are performed according to the tissue structure of a permanent magnet, because the permanent magnet has a crystal grain size of few micrometers (μm), the number of meshes increases with a mesh size of approximately 1 nm. If the mesh size is increased, flexibility used for calculations lowers, which can shorten the calculation time; however, because the angles formed by magnetization vectors adjacent to each other increase, the calculation accuracy significantly worsens. For this reason, if the mesh size is increased without consideration, the calculation accuracy is not ensured.

Thus, there is a related technology in which the angle of rotation between two magnetization vectors arranged at the centers of elements (meshes) adjacent to each other is interpolated with reference to the rotation axis perpendicular to the two magnetization vectors and an exchange field is calculated.

There is another related technology in which an effective magnetic field that acts on each element to be analyzed is calculated using, as a fixed value, a magnetic field calculated by magnetic field analysis using a finite element method and a magnetization vector in each element is calculated using the calculated effective magnetic field, so that the speed of analyzing the characteristics of a magnetic substance is increased.

There is still another related technology in which a magnetic substance is divided into an analysis region and a non-analysis region and the non-analysis region is coarse grained using a representative region, so that the time for calculating the demagnetizing field from the non-analysis region acting on the magnetization in the analysis region and the calculation resources are reduced.

Patent Document 1: Japanese Laid-open Patent Publication No. 2012-033116
Patent Document 2: Japanese Laid-open Patent Publication No. 2013-131072
Patent Document 3: Japanese Laid-open Patent Publication No. 2013-196462

Micromagnetic simulation has a problem in that an increase in the mesh size worsens the calculation accuracy. For this reason, a technology that allows accurate simulations even with a mesh size that worsens the calculation accuracy is important.

SUMMARY

According to an aspect of the embodiments, a magnetization analysis apparatus includes a processor configured to execute a process including: first calculating, using a magnetization vector of each of elements obtained by mesh division in which a magnetic substance is divided into a plurality of meshes and a magnetization vector of an element adjacent to each element, intermediate magnetization that is a magnetization vector at the halfway point between each element and an element adjacent to each element; second calculating an effective magnetic field using the intermediate magnetization calculated at the first calculating; and third calculating a magnetization vector of each element after a unit time based on the effective magnetic field calculated at the second calculating.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The magnetization analysis apparatus is an apparatus that performs micromagnetic simulations and that calculates a magnetization vector for a given time at each given time step and displays the magnetization vector. The present invention is not limited to the embodiment and it can be widely applied to magnetization analysis.

Configuration of Magnetization Apparatus

Figure 1:
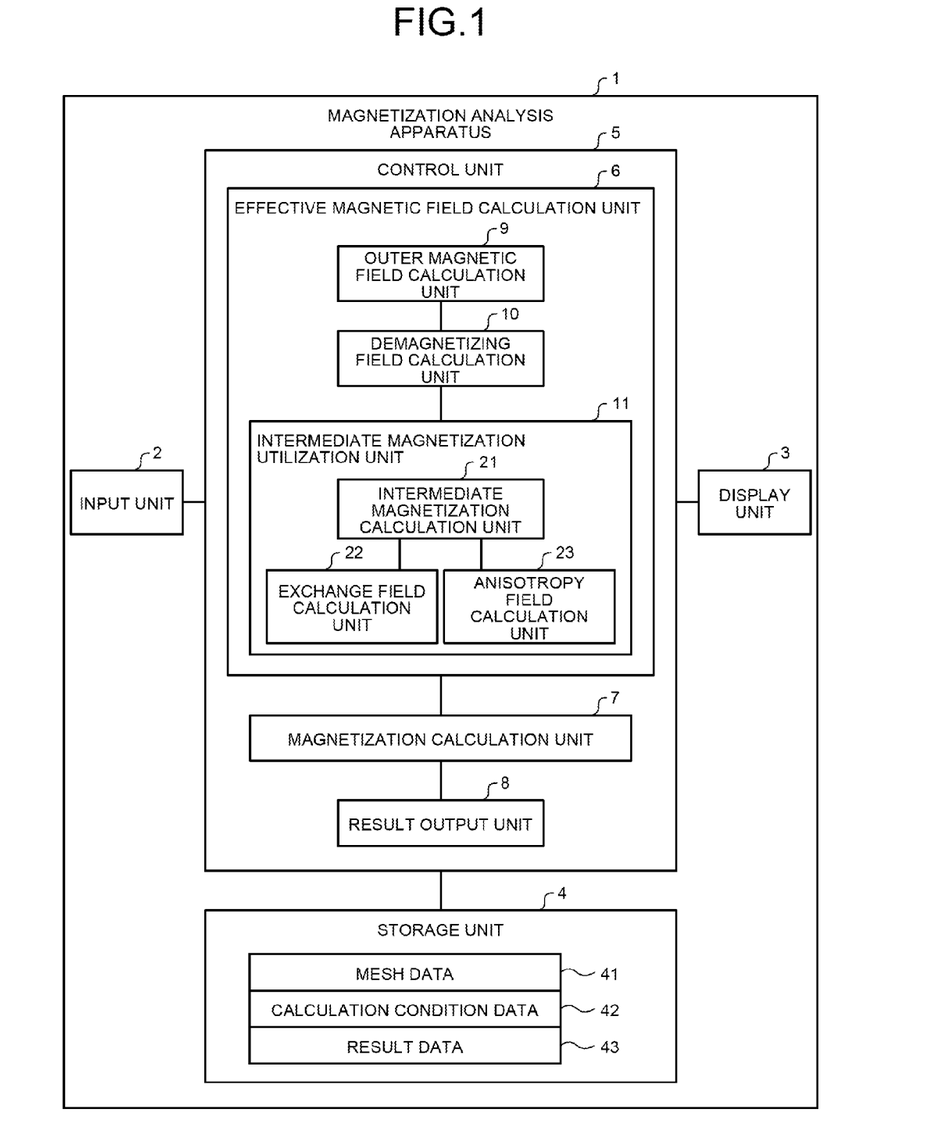
FIG. 1 is a functional block diagram illustrating a configuration of a magnetization analysis apparatus according to an embodiment.

FIG. 1 is a functional block diagram illustrating a configuration of a magnetization analysis apparatus according to the embodiment. As illustrated in FIG. 1, a magnetization apparatus 1 includes an input unit 2, a display unit 3, a storage unit 4, and a control unit 5.

The input unit 2 is an input device for a user who performs an analysis to input various types of information and instructions to the magnetization analysis apparatus 1. For example, the input unit 2 corresponds to a keyboard, a mouse, and a touch panel. The display unit 3 is a display device that displays various types of information. For example, the display unit 3 corresponds to a display.

The storage unit 4 is a semiconductor memory device, such as a random access memory (RAM) or a flash memory, or a storage device, such as a hard disk or an optical disk. The storage unit 4 stores mesh data 41, calculation condition data 42, and result data 43.

The mesh data 41 is data consisting of a plurality of elements obtained by dividing a region of a magnetic substance to be analyzed into a finite number of regions by a finite element method or a finite difference method. An element is a region of a minimum unit that is obtained by dividing the region to be analyzed and consists of a plurality of nodes.

The calculation condition data 42 is data on calculation conditions for magnetization analysis. The calculation condition data 42 contains, for example, the number of individual elements of meshes that are dealt with by a finite element method or a finite difference method and the value of a time step.

The result data 43 is data illustrating the result of magnetization analysis, i.e., micromagnetic simulation. The result data 43 contains the value of calculation of a magnetic vector of each element for a given time at each time step.

The control unit 5 corresponds to an electronic circuit, such as a central processing unit (CPU). The control unit 5 includes an internal memory for storing programs defining various processing procedures and control data and executes various types of processing according to the programs and control data. For example, the control unit 5 executes magnetization analysis processing. In the magnetization analysis processing, the mesh data 41 and the calculation condition data 42 are read from the storage unit 4 and calculations are started. In the magnetization analysis processing, during the calculation process, magnetization vectors are arranged at respective elements of the mesh data 41 and the arranged magnetization vectors are saved as data at spots (e.g. magnetic fields) in the storage unit 4.

The control unit 5 includes an effective magnetic field calculation unit 6, a magnetization calculation unit 7, and a result output unit 8. The effective magnetic field calculation unit 6 calculates an effective magnetic field of each element at each time step. The magnetization calculation unit 7 calculates a magnetization vector at each time step from the effective magnetic field that is calculated by the effective magnetic field calculation unit 6 and stores the calculation result as result data 42 in the storage unit 4. Using the result data 42, the result output unit 8 outputs the magnetization vector for a given time to the display unit 3.

The method of calculating a magnetization vector and an effective magnetic field will be described here. Equation (1) is an equation (control equation) that controls the motion of micromagnetization and that is referred to as the Landau-Lifshitz-Gilbert equation.

$$\frac{\partial \vec{m}}{\partial t} = -\gamma \vec{m} \times \vec{H}_{\mathit{eff}} + \alpha\left(\vec{m} \times \frac{\partial \vec{m}}{\partial t}\right) \quad |\vec{m}| = 1 \tag{1}$$

In Equation (1), m added with "→" above its top, $\gamma$, $\alpha$, and $H_{\mathit{eff}}$ added with "→" above its top are a magnetization vector, a gyromagnetic ratio, a coefficient of friction, and an effective magnetic field, respectively. "→" denotes a vector. Hereinafter, "→" denoting a vector is used in only equations and will be omitted in other descriptions. "×" represents a cross product.

As represented by Equation (2), the effective magnetic field $H_{\mathit{eff}}$ is a synthesis of a plurality of magnetic field vectors. The magnetic fields acting on the micro magnetization are an outer magnetic field $H_{out}$, a demagnetizing field $H_{demag}$, an anisotropy field $H_{an}$, and an exchange field $H_{ex}$. Each of the demagnetizing field $H_{demag}$, the anisotropy field $H_{an}$, and the exchange field $H_{ex}$ are calculated according to Equations (3), (4) and (5), respectively.

$$\vec{H}_{\mathit{eff}} = \vec{H}_{out} + \vec{H}_{demag} + \vec{H}_{an} + \vec{H}_{ex} \tag{2}$$

$$\vec{H}_{demag} = -\nabla \phi \tag{3}$$

$$\vec{H}_{an} = \frac{2K_u}{M_s}(\vec{m} \cdot \vec{u}_{ani})\vec{u}_{ani} \tag{4}$$

$$\vec{H}_{ex} = \frac{2A}{M_s}\nabla^2 \vec{m} \tag{5}$$

In the equations, $\phi$ is a magnetostatic potential, $M_s$ is saturation magnetization, $K_u$ is a magnetic anisotropy constant, $u_{ani}$ is a magnetic anisotropy vector, and A is an exchange constant. The exchange field $H_{ex}$ is a force acting between atoms that are originally adjacent to each other. In order to perform an analysis while maintaining the calculation accuracy using an analysis model that is generated using mesh division that is division into a plurality of meshes each in a size larger than the distance between atoms, it is preferable to perform mesh division such that the change between the angles of magnetization vectors adjacent to each other is kept small to some extent.

The following descriptions refer back to FIG. 1. The effective magnetic field calculation unit 6 includes an outer magnetic field calculation unit 9, a demagnetizing field calculation unit 10, and an intermediate magnetization utilization unit 11. The outer magnetic field calculation unit 9 calculates an outer magnetic field $H_{out}$ at each time step. The demagnetizing field calculation unit 10 calculates a demagnetizing field $H_{demag}$ at each time step.

Figure 2:
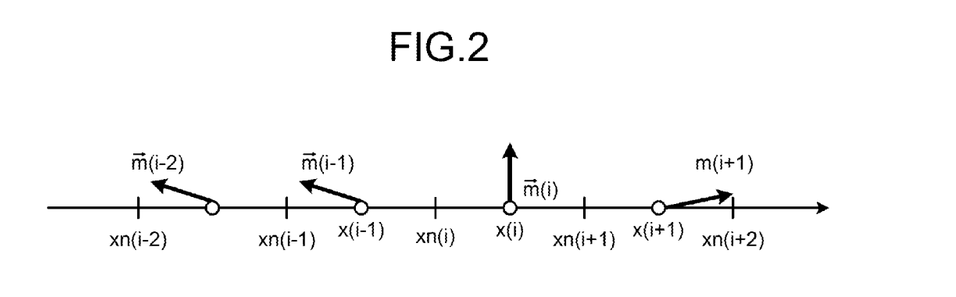
FIG. 2 is a diagram illustrating a one-dimensional magnetization arrangement.
Figure 3:
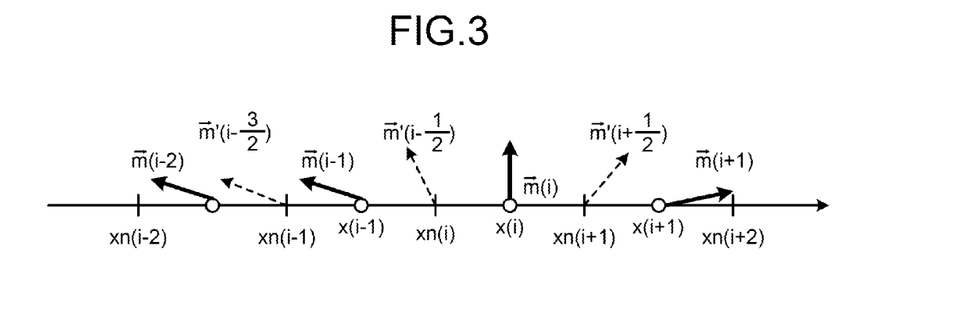
FIG. 3 is a diagram illustrating a one-dimensional intermediate magnetization arrangement.

The intermediate magnetization utilization unit 11 calculates an anisotropy field $H_{an}$ and an exchange field $H_{ex}$ using intermediate magnetization. The intermediate magnetization is virtual magnetization that is arranged at the halfway point between sets of magnetization adjacent to each other. The magnitude of the magnetization vector of the intermediate magnetization is 1. FIG. 2 is a diagram illustrating a one-dimensional magnetization arrangement and FIG. 3 is a diagram illustrating a one-dimensional intermediate magnetization arrangement.

It is supposed that, as illustrated in FIG. 2, there is spatially discrete magnetization. According to FIG. 2, magnetization in an area from a coordinate xn(i) to a coordinate xn(i+1) is denoted as a magnetization vector m(i), and m(i) is arranged at a center positon x(i) of the interval. In a normal one-dimensional finite volume method, an exchange field $H_{ex}$ and an anisotropy field $H_{an}$ are calculated according to the following Equations (6) and (7).

$$\vec{H}_{an}(i) = \frac{2K_u}{M_s}(\vec{m}(i) \cdot \vec{u}_{ani})\vec{u}_{ani} \tag{6}$$

$$\vec{H}_{ex}(i) = \frac{2A}{M_s}\left(\frac{\vec{m}(i+1) - \vec{m}(i)}{x(i+1) - x(i)} - \frac{\vec{m}(i) - \vec{m}(i-1)}{x(i) - x(i-1)}\right)\frac{2}{x(i+1) - x(i-1)} \tag{7}$$

On the other hand, the intermediate magnetization utilization unit 11 arranges intermediate magnetization as illustrated in FIG. 3. For example, the intermediate magnetization utilization unit 11 arranges intermediate magnetization m'(i−½) at a center position xn(i) between x(i−1) and x(i) and arranges intermediate magnetization m'(i+½) at a center position xn(i+1) between x(i) and x(i+1). Equation (8) represents the intermediate magnetization and Equation (9) represents the coordinate of the position of the intermediate magnetization.

$$\vec{m}'\left(i + \frac{1}{2}\right) = \frac{\vec{m}(i+1) + \vec{m}(i)}{|\vec{m}(i+1) + \vec{m}(i)|} \tag{8}$$

$$x'\left(i + \frac{1}{2}\right) = \frac{x(i+1) + x(i)}{2} \tag{9}$$

The intermediate magnetization utilization unit 11 calculates an exchange field $H_{ex}$ using the intermediate magnetization according to Equation (10) and calculate an anisotropy field $H_{an}$ according to Equations (11) to (13).

$$\vec{H}_{ex}(i) = \tag{10}$$

$$\frac{2A}{M_s}\left(\frac{\vec{m}'\left(i+\frac{1}{2}\right) - \vec{m}(i)}{x'\left(i+\frac{1}{2}\right) - x(i)} - \frac{\vec{m}(i) - \vec{m}'\left(i-\frac{1}{2}\right)}{x(i) - x'\left(i-\frac{1}{2}\right)}\right)\frac{2}{x'\left(i+\frac{1}{2}\right) - x'\left(i-\frac{1}{2}\right)}$$

Equation 11

$$\vec{H}_{an}(i) = \tag{11}$$

$$-\frac{1}{dx(i)}\left[\frac{\partial}{\partial \vec{m}(i)}E_{ani}\left(\vec{m}'\left(i-\frac{1}{2}\right)\right)\frac{dx\left(i-\frac{1}{2}\right)}{2M_s} + \frac{\partial}{\partial \vec{m}(i)}E_{ani}(\vec{m}(i))\frac{dx(i)}{2M_s} + \right.$$

$$\left. \frac{\partial}{\partial \vec{m}(i)}E_{ani}\left(\vec{m}'\left(i+\frac{1}{2}\right)\right)\frac{dx\left(i+\frac{1}{2}\right)}{2M_s}\right]$$

$$E_{ani}(\vec{m}) = -K_1(\vec{u}_{ani} \cdot \vec{m})^2 \tag{12}$$

$$\frac{\partial}{\partial \vec{m}(i)}E_{ani}\left(\vec{m}'\left(i+\frac{1}{2}\right)\right) = \frac{\partial \vec{m}'\left(i+\frac{1}{2}\right)}{\partial \vec{m}(i)}\frac{\partial}{\partial \vec{m}'\left(i+\frac{1}{2}\right)}E_{ani}\left(\vec{m}'\left(i+\frac{1}{2}\right)\right) \tag{13}$$

Figure 4:
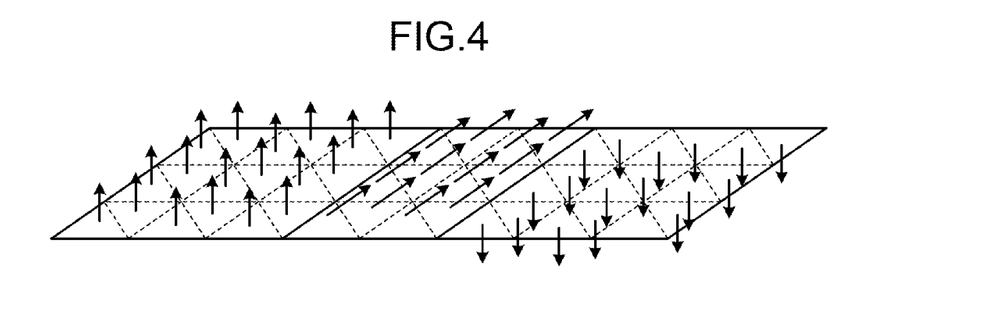
FIG. 4 is a schematic diagram of two-dimensionally distributed discrete elements and magnetization.

FIG. 4 is a schematic diagram of two-dimensionally distributed discrete elements and magnetization. It is supposed that, as illustrated in FIG. 4, there is spatially discrete magnetization. According to FIG. 4, a two-dimensional space is divided into triangular elements and the magnetization on each triangular element i is m(i) and m(i) is arranged at the center of gravity of each element. In a normal two-dimensional finite volume method, an exchange field $H_{ex}$ and anisotropy field $H_{an}$ are calculated according to the following Equations (14) and (15).

$$\vec{H}_{ex(i,j)} = \frac{2A}{V_i M_s}\sum_j S_{ij}\frac{\vec{m}(i) - \vec{m}(j)}{|\vec{l}(i,j) \cdot \vec{n}(i,j)|} \tag{14}$$

$$\vec{H}_{an}(i) = \frac{2K_u}{M_s}(\vec{m}(i) \cdot \vec{u}_{ani})\vec{u}_{ani} \tag{15}$$

In those equations, $V_i$ is the area of a triangular element i and $S_{ij}$ is the length of a side shared between an element i and its adjacent element j, and l(i,j) and n(i,j) are an adjacent-elements centroid distance vector and a normal vector at a side shared with the adjacent element.

Figure 5:
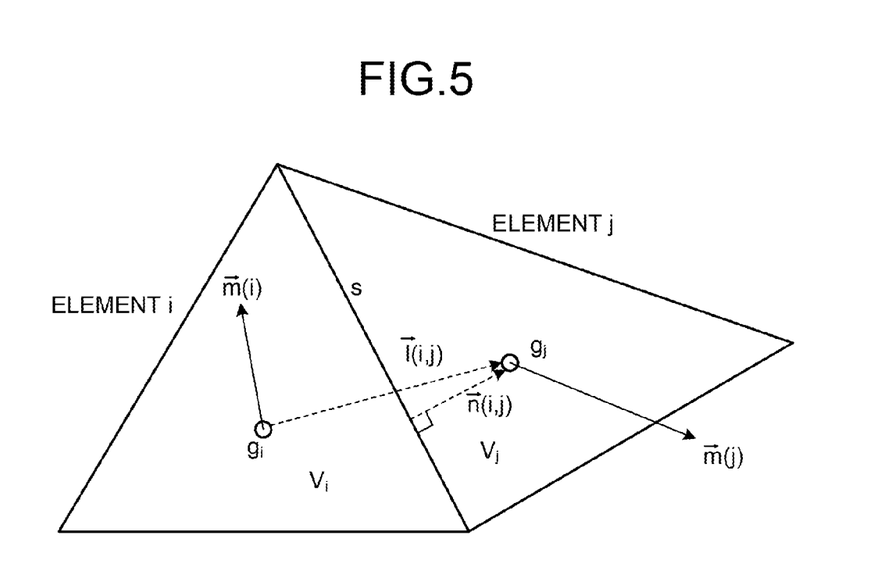
FIG. 5 is a diagram for explaining an adjacent-elements centroid distance vector and a normal vector at a side shared with an adjacent element.

FIG. 5 is a diagram for explaining an adjacent-elements centroid distance vector and a normal vector at a side shared with an adjacent element. As illustrated in FIG. 5, an adjacent-elements centroid distance vector l(i,j) is a vector from the center of gravity $g_i$ of an element i and toward the center of gravity $g_j$ of an element j. A normal vector n(i,j) at a side shared with the adjacent element is a vector from a side s shared with the adjacent element and toward the center of gravity $g_j$ of the element j, which is a vector perpendicular to the shared side s. In other words, the adjacent-elements centroid distance vector and the normal vector at the side shared with the adjacent element are toward the adjacent element.

Figure 6:
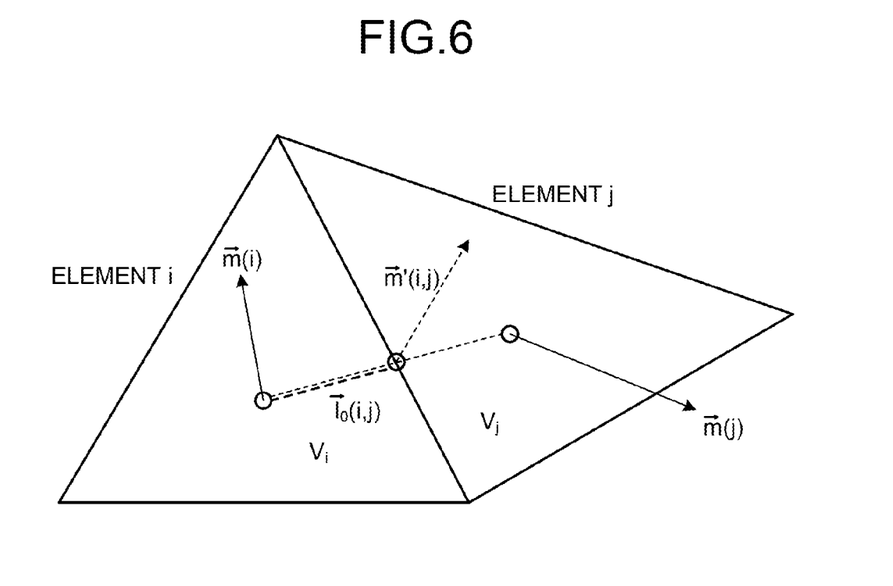
FIG. 6 is a diagram for explaining intermediate magnetization of an exchange field.

On the other hand, the intermediate magnetization utilization unit 11 calculates an exchange field and an anisotropy field. FIG. 6 is a diagram for explaining intermediate magnetization of an exchange field. Equation (16) represents intermediate magnetization m'(i,j) and Equation (17) represents an exchange field $H_{ex}$.

$$\vec{m}'(i,j) = \frac{\left(1 - \frac{|\vec{l}_0(i,j)|}{|\vec{l}(i,j)|}\right)\vec{m}(i) + \frac{|\vec{l}_0(i,j)|}{|\vec{l}(i,j)|}\vec{m}(j)}{\left|\left(1 - \frac{|\vec{l}_0(i,j)|}{|\vec{l}(i,j)|}\right)\vec{m}(i) + \frac{|\vec{l}_0(i,j)|}{|\vec{l}(i,j)|}\vec{m}(j)\right|} \tag{16}$$

$$\vec{H}_{ex(i,j)} = \frac{2A}{V_i M_s}\sum_j S_{ij}\frac{\vec{m}(i) - \vec{m}'(j,j)}{|\vec{l}(i,j) \cdot \vec{n}(i,j)|} \tag{17}$$

In the equations, $l_0(i,j)$ is, as illustrated in FIG. 6, a vector parallel to the vector of an adjacent element, connecting to the intersection with the shared side, and toward the adjacent element.

Figure 7:
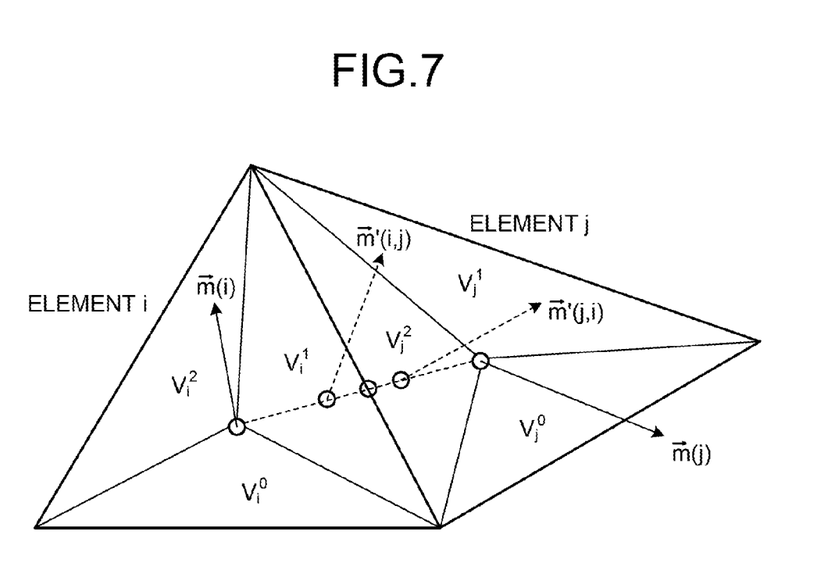
FIG. 7 is a diagram for explaining intermediate magnetization of an anisotropy field.

FIG. 7 is a diagram for explaining intermediate magnetization of an anisotropy field. $V_i^j$ is a certain area that is determined from an adjacent element and the center of gravity. Equation (18) represents two sets of intermediate magnetization m'(i,j) and m'(j,i) and Equations (19) to (22) represents an anisotropy field $H_{an}$. When calculating an anisotropy field, because an anisotropy field is formulated as a differential of energy per element volume, the intermediate magnetization utilization unit 11 divides an element i into three elements $V_i^j$ as illustrated in FIG. 7 and calculates an anisotropy field $H_{an}$ using intermediate magnetization corresponding to each element.

$$\vec{m}'(i, j) = \frac{\left(1 - \frac{|\vec{l}_0(i,j)|}{2|\vec{l}(i,j)|}\right)\vec{m}(i) + \frac{|\vec{l}_0(i,j)|}{2|\vec{l}(i,j)|}\vec{m}(j)}{\left|\left(1 - \frac{|\vec{l}_0(i,j)|}{|\vec{l}(i,j)|}\right)\vec{m}(i) + \frac{|\vec{l}_0(i,j)|}{|\vec{l}(i,j)|}\vec{m}(j)\right|}, \quad (18)$$

$$\vec{m}'(i, j) = \frac{\frac{|\vec{l}_0(j,i)|}{2|\vec{l}(j,i)|}\vec{m}(j) + \left(1 - \frac{|\vec{l}_0(j,i)|}{2|\vec{l}(j,i)|}\right)\vec{m}(i)}{\left|\frac{|\vec{l}_0(j,i)|}{2|\vec{l}(j,i)|}\vec{m}(j) + \left(1 - \frac{|\vec{l}_0(j,i)|}{2|\vec{l}(j,i)|}\right)\vec{m}(i)\right|}$$

$$\vec{H}_{an} = -\frac{1}{V_i}\frac{\partial}{\partial \vec{m}(i)}\sum_j [E_{an}(\vec{m}'(i,j))V_i^j + E_{an}(\vec{m}'(j,i))V_j^i] \quad (19)$$

$$E_{an}(\vec{m}) = -K_1(\vec{u}_{an} \cdot \vec{m})^2 \quad (20)$$

$$\frac{\partial}{\partial \vec{m}(i)}E_{an}(\vec{m}'(i,j)) = \frac{\partial \vec{m}'(i,j)}{\partial \vec{m}(i)}\frac{\partial}{\partial \vec{m}'(i,j)}E_{an}\vec{m}'(i,j) \quad (21)$$

$$\frac{\partial}{\partial \vec{m}(i)}E_{an}(\vec{m}'(j,i)) = \frac{\partial \vec{m}'(j,i)}{\partial \vec{m}(i)}\frac{\partial}{\partial \vec{m}'(j,i)}E_{an}\vec{m}'(j,i) \quad (22)$$

The following descriptions refer back to FIG. 1. The intermediate magnetization utilization unit 11 includes an intermediate magnetization calculation unit 21, an exchange field calculation unit 22, and an anisotropy field calculation unit 23. The intermediate magnetization calculation unit 21 calculates intermediate magnetization. The exchange field calculation unit 22 calculates an exchange field using the intermediate magnetization calculated by the intermediate magnetization calculation unit 21. The anisotropy field calculation unit 23 calculates an anisotropy field using the intermediate magnetization calculated by the intermediate magnetization calculation unit 21.

Flowchart of Magnetization Analysis Processing

Figure 8:
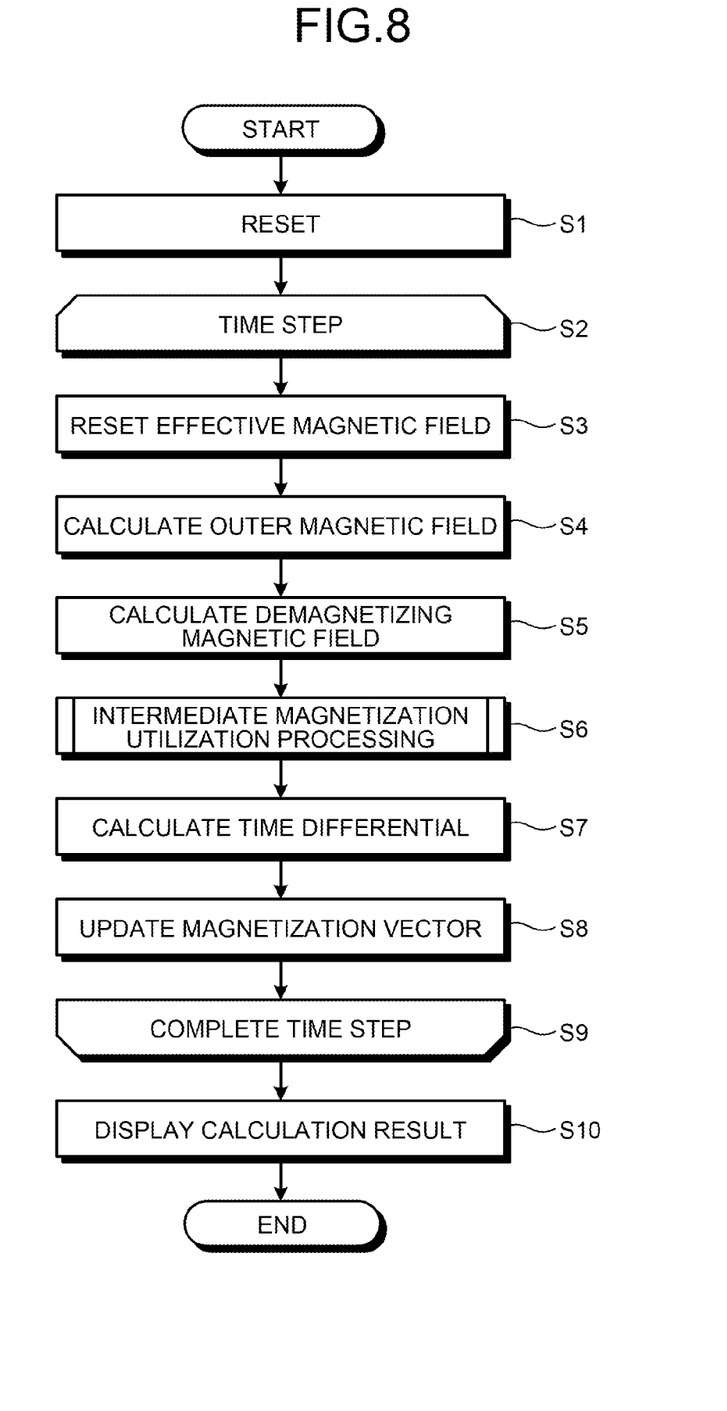
FIG. 8 is a flowchart illustrating a flow of magnetization analysis processing according to the embodiment.

The flow of the magnetization analysis processing according to the embodiment will be described here. FIG. 8 is a flowchart illustrating the flow of the magnetization analysis processing according to the embodiment. As illustrated in FIG. 8, the magnetization analysis apparatus 1 first performs resetting for magnetization analysis (step S1).

The magnetization analysis apparatus 1 then repeatedly performs the processing between step S2 and step S9 on all magnetization vectors m(i) for a given time at each time step. Specifically, the effective magnetic field calculation unit 6 resets the effective magnetic field (step S3). The outer magnetic field calculation unit 9 calculates an outer magnetic field (step S4) and adds the outer magnetic field to the effective magnetic field. The demagnetizing field calculation unit 10 calculates a demagnetizing field (step S5) and adds the demagnetizing field to the effective magnetic field. The intermediate magnetization utilization unit 11 performs intermediate magnetization utilization processing of calculating an exchange field and an anisotropy field and adding the exchange field and the anisotropy field to the effective magnetic field (step S6). The magnetization calculation unit 7 calculates a time differential of a magnetization vector using the effective magnetic field (step S7) and updates the magnetization vector using the time differential of the magnetization vector (step S8).

When the repetition for the given time completes, the result output unit 8 displays the calculation result (step S10). In other words, the result output unit 8 displays the result of simulating magnetization vectors on the display unit 3.

Figure 9:
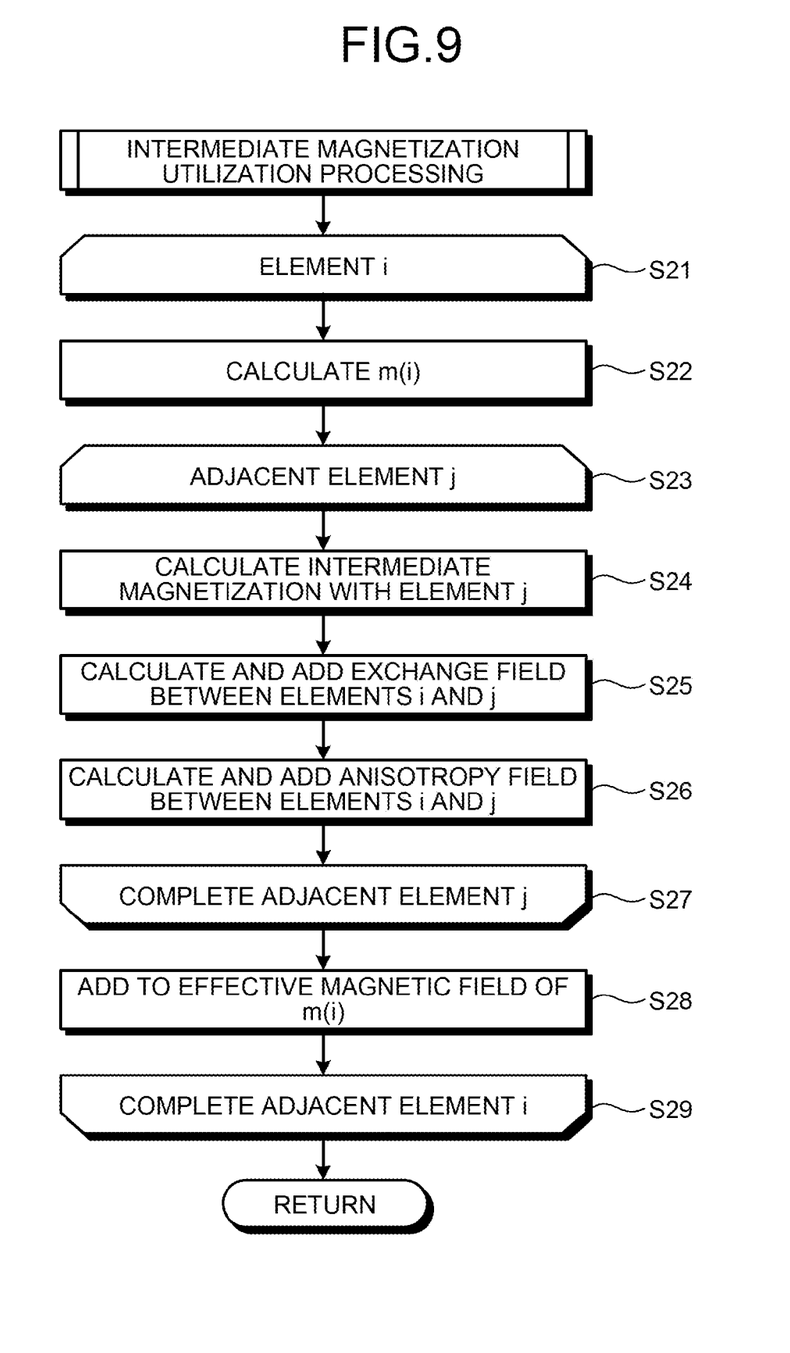
FIG. 9 is a flowchart illustrating a flow of intermediate magnetization utilization processing.

FIG. 9 is a flowchart illustrating the flow of the intermediate magnetization utilization processing. As illustrated in FIG. 9, the intermediate magnetization utilization unit 11 performs the processing between step S21 and step S29 as processing on an element i on all elements while changing i.

As for each element i, the intermediate magnetization utilization unit 11 calculates a magnetization vector m(i) (step S22). As for each adjacent element j adjacent to an element i, the intermediate magnetization utilization unit 11 performs processing between step S23 and step S27.

As for each adjacent element j, the intermediate magnetization calculation unit 21 performs intermediate magnetization with an adjacent element j (step S24). The exchange field calculation unit 22 then calculates an exchange field between elements i and j, i.e., an element i and an element j, and adds the exchange field to the exchange field of the element i (step S25). The anisotropy field calculation unit 23 then calculates an anisotropy field between the elements i and j and adds the anisotropy field to the anisotropy field of the element i (step S26).

When the processing on all adjacent elements j completes, the intermediate magnetization utilization unit 11 adds the exchange field and the anisotropy field of the element i to the effective magnetic field of m(i) (step S28). Once the intermediate magnetization utilization unit 11 calculates an effective magnetic field as for each element i, the process ends (step S29).

As described above, the intermediate magnetization utilization unit 11 calculates an exchange field and an an anisotropy field, which can improve the accuracy of calculating a magnetization vector.

Advantage of Embodiment

In order to indicate the advantage of the embodiment, the mesh-size dependency of a domain wall pinning field of a material with great magnetic anisotropy will be described here. A pinning field $H_{pin}$ is an outer magnetic field at a time when an outer magnetic field is applied to a magnetic substance consisting of an A phase, a B phase, and a C phase and the domain near the B phase is withdrawn to the A phase.

Figure 10:
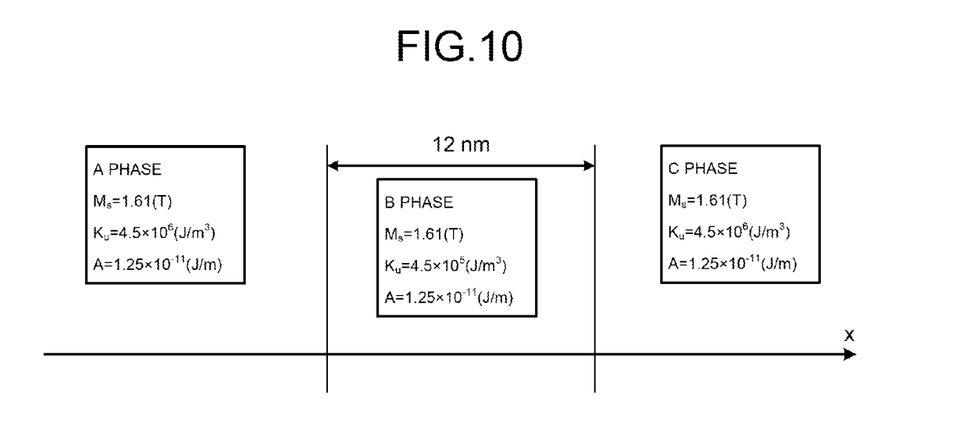
FIG. 10 is a diagram illustrating a domain wall pinning field calculation model.

FIG. 10 is a diagram illustrating a domain wall pinning field calculation model. As illustrated in FIG. 10, this model consists of three phases of an A phase, a B phase, and a C phase. The size of the B phase is 12 nm. The A, B, and C phases are different from one another in any one of parameters $M_s$, $K_u$, and A representing the magnetic properties of the magnetic material. When there is such spatial non-uniformity in the magnetic properties, domain wall pinning occurs.

Figure 11:
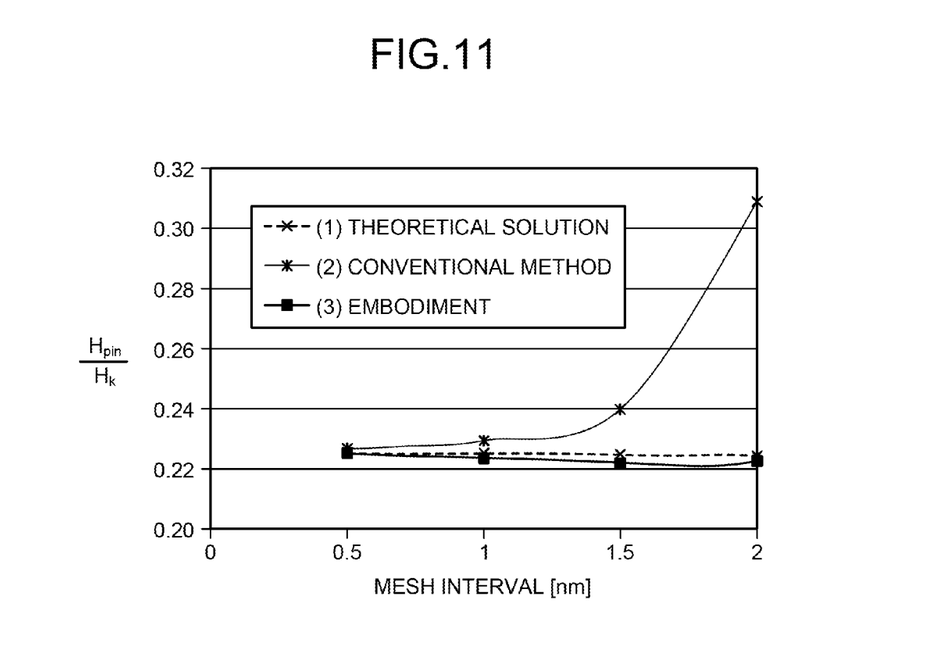
FIG. 11 is a diagram illustrating mesh-size dependency of a pinning field.

FIG. 11 is a diagram illustrating mesh-size dependency of a pinning field. In FIG. 11, the vertical axis represents $H_{pin}/H_k$ and the horizontal axis represents the mesh interval, where $H_k$ is an anisotropy field ($2K_u/M_s$). As illustrated in FIG. 11, in Related method (2), when the mesh interval increases, the pinning field increases due to the numerical difference. On the other hand, in the case of (3) where the intermediate magnetization according to the embodiment is used, even when the mesh interval is increased to approximately 2 nm, the pinning filed is approximately the same as that of Theoretical solution (1), so that it is possible to calculate a pinning field highly accurately. This allows magnetization analysis apparatuses having the same specification to perform micromagnetic calculations in a much wider range.

As described above, according to the embodiment, the intermediate magnetization calculation unit 21 calculates a magnetization vector at the halfway point between elements adjacent to each other as intermediate magnetization, and the exchange field calculation unit 22 and the anisotropy field calculation unit 23 calculate an exchange field and an anisotropy field, respectively, using the intermediate magnetization. The intermediate magnetization calculation unit 21 sets the magnitude of the magnetization vector of the intermediate magnetization at 1. Accordingly, the magnetization analysis apparatus 1 can calculate an exchange field and an anisotropy field accurately and calculate an effective magnetic field accurately. Thus, the magnetization analysis apparatus 1 can calculate magnetization vectors accurately, which improves the calculation accuracy of micromagnetic simulations.

When simulations are performed with the halved mesh size, the magnetization analysis apparatus has to store the double amount of information at each dimension. On the other hand, when intermediate magnetization is used, it suffices if the magnetization analysis apparatus stores only information relevant to elements for which magnetization vectors are calculated, which allows a simulation with a smaller amount of memory than that in a case of the half mesh size.

Figure 12:
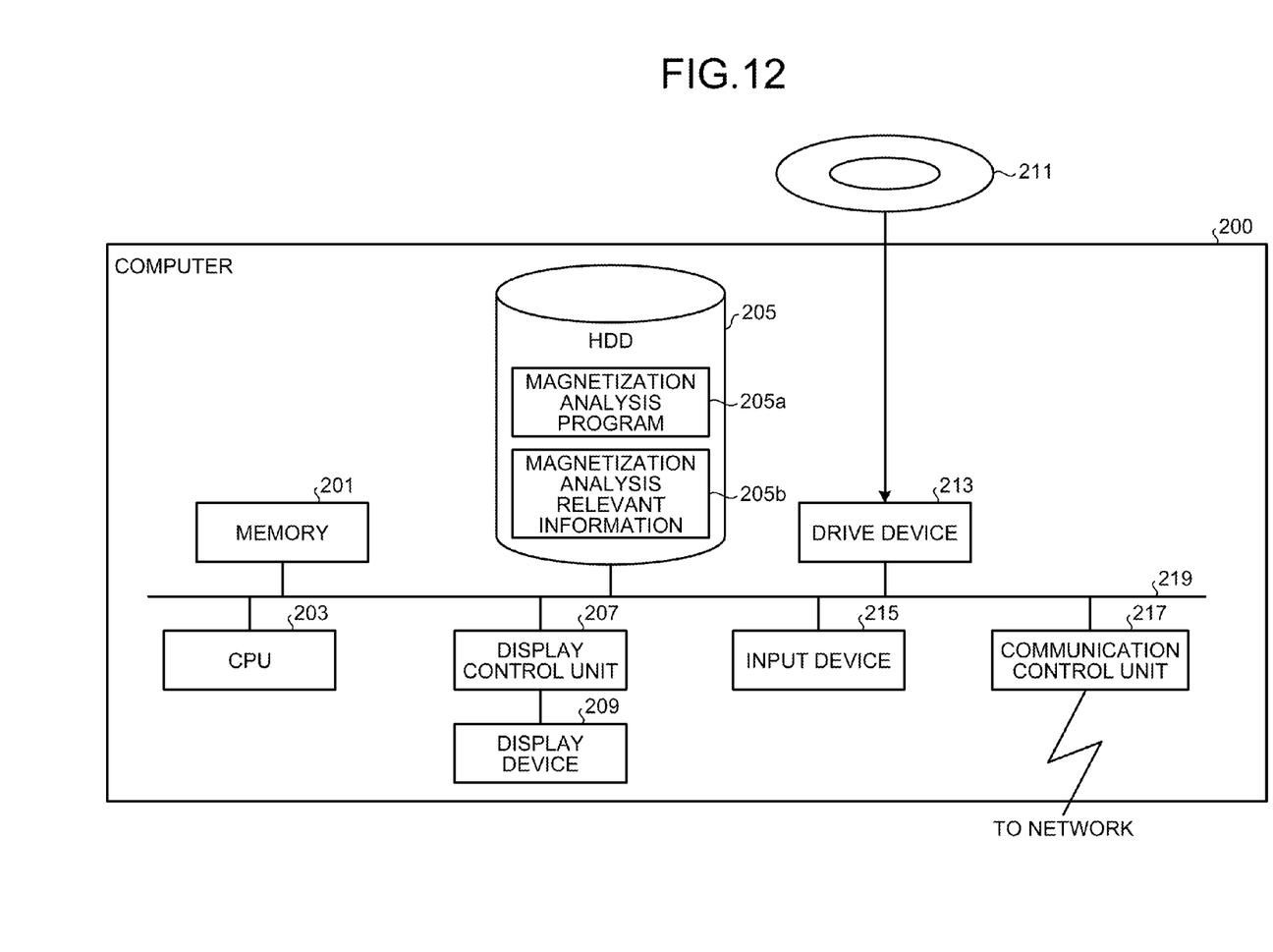
FIG. 12 is a diagram illustrating an exemplary computer that executes a magnetization analysis program.

Various types of processing described in the embodiment can be implemented by executing a program prepared in advance by a computer, such as a personal computer or a work station. An exemplary computer that executes a magnetic analysis program that implements the same functions as those of the magnetization analysis apparatus 1 illustrated in FIG. 1 will be described below. FIG. 12 is a diagram of an exemplary computer that executes the magnetization analysis program.

As illustrated in FIG. 12, a computer 200 includes a CPU 203 that executes various arithmetic operations, an input device 215 that receives input of data from a user, and a display control unit 207 that controls a display device 209. The computer 200 further includes a drive device 213 that reads a program, etc. from a storage medium and a communication control unit 217 that gives and receives data to and from other computers via a network. The computer 200 includes a memory 201 that temporarily stores various types of information and an HDD 205. The memory 201, the CPU 203, the HDD 205, the display control unit 207, the drive device 213, the input device 215, and the communication control unit 217 are connected via a bus 219.

The drive device 213 is a device for, for example, a removable disk 211. The HDD 205 stores a magnetization analysis program 205a and magnetization analysis relevant information 205b.

The CPU 203 reads and loads the magnetization analysis program 205a into a memory 201 and executes the magnetization analysis program 205a as a process. The magnetization analysis relevant information 205b corresponds to, for example, the mesh data 41, calculation condition data 42, and result data 43. For example, the removable disk 211 stores each type of information, such as the magnetization analysis program 205a.

The magnetization analysis program 205a is not necessarily stored in the HDD 205 in advance. For example, the magnetization analysis program 205a may be stored in a "portable physical medium", such as a flexible disk (FD), a CD-ROM, a DVD disk, magneto-optical disk, or an IC card, that is inserted into the computer 200 and the computer 200 may read the magnetization analysis program 205a from the portable physical disk and execute the program.

As the embodiment, a case where an exchange field and an anisotropy field using intermediate magnetization has been described; however, the present invention is not limited to this. The present invention can be applied to, for example, a case where only an exchange filed or an anisotropy field is calculated using intermediate magnetization.

According to the embodiment, it is possible to improve the calculation accuracy of micromagnetic simulations.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A magnetization analysis apparatus comprising:
a processor configured to execute a process including:
first calculating, using a magnetization vector of each of elements obtained by mesh division in which a magnetic substance is divided into a plurality of meshes and a magnetization vector of an element adjacent to each element, intermediate magnetization that is a magnetization vector at the halfway point between each element and an element adjacent to each element;
second calculating an effective magnetic field using the intermediate magnetization calculated at the first calculating; and
third calculating a magnetization vector of each element after a unit time based on the effective magnetic field calculated at the second calculating.

2. The magnetization analysis apparatus according to claim 1, wherein the second calculating includes calculating an effective magnetic field by calculating an exchange field and an anisotropy field using the intermediate magnetization.

3. The magnetization analysis apparatus according to claim 2, wherein
the first calculating includes calculating, in a case of two dimensions, two sets of intermediate magnetization to calculate the anisotropy field, and
the second calculating includes calculating the anisotropy field using the two sets of intermediate magnetization.

4. The magnetization analysis apparatus according to claim 1, wherein the first calculating includes calculating intermediate magnetization including a magnitude of 1.

5. A magnetization analysis method comprising:
first calculating, using a magnetization vector of each of elements obtained by mesh division in which a magnetic substance is divided into a plurality of meshes and a magnetization vector of an element adjacent to each element, intermediate magnetization that is a magnetization vector at the halfway point between each element and an element adjacent to each element, by a processor;

second calculating an effective magnetic field using the intermediate magnetization calculated at the first calculating, by the processor; and third calculating a magnetization vector of each element after a unit time based on the effective magnetic field calculated at the second calculating, by the processor.

6. A non-transitory computer-readable recording medium having stored therein a magnetization analysis program that causes a computer to execute a process comprising:

first calculating, using a magnetization vector of each of elements obtained by mesh division in which a magnetic substance is divided into a plurality of meshes and a magnetization vector of an element adjacent to each element, intermediate magnetization that is a magnetization vector at the halfway point between each element and an element adjacent to each element;

second calculating an effective magnetic field using the intermediate magnetization calculated at the first calculating; and third calculating a magnetization vector of each element after a unit time based on the effective magnetic field calculated at the second calculating.

* * * * *